INVENTOR
CEBERN B. TRIMBLE

BY Louis A Kline
Albert L. Sessler, Jr.
HIS ATTORNEYS

INVENTOR
CEBERN B. TRIMBLE
BY Louis A. Kline
Albert L. Sessler, Jr.
HIS ATTORNEYS 3,100,591
Patented Aug. 13, 1963

3,100,591

RECORD MEDIA HANDLING APPARATUS

Cebern B. Trimble, Dayton, Ohio, assignor to The National Cash Register Company, Dayton, Ohio, a corporation of Maryland Filed Jan. 19, 1961, Ser. No. 83,812
15 Claims. (Cl. 226—39)

The present invention relates generally to high-speed record media handling apparatus, and more particularly to a novel driving and braking arrangement for such apparatus.

The present invention is adapted to handle a number of different types of record media, but for illustrative purposes it will be described primarily as a perforated tape handling device. It will be recognized, however, that other types of record members, such as punched cards, could also be handled by the present invention.

Perforated paper tape is a very common type of medium for the storage and transmission of information used in modern data-processing and computing systems. Among its advantages for such use are low cost, ease of encoding the information on the tape, permanence, and ease of storage and transportation. The tape may be generated in a number of different ways, as, for example, by recorders in point-of-sale recording systems, or by card-to-tape converters for converting punched card information to tape information. The tapes thus generated may be transmitted to a central processing unit in which the data encoded on the tape is sensed by a tape-reading device and is converted into electrical signals for use by the central processing unit.

Due to the high operating speed of modern data-processing and computing devices, a tape-sensing device must also operate at a high speed for maximum efficiency. Since intermittent sensing, with a large number of starts and stops of the motion of the tape, is a characteristic of the manner in which information is read from the tape by the sensing means and utilized in the central processing unit, extremely rapid acceleration and deceleration of the tape become of paramount importance.

In order to achieve the desired rapid acceleration and deceleration of the tape, a number of problems must be resolved, among which are mechanical inertia of the operating parts; passage of repaired tape sections, such as splices, through the tape-handling apparatus; and possibility of tape breakage due to the high stresses imposed on the tape.

An important advance in overcoming the foregoing problems has been made by a previous invention of the present inventor, which is the subject of United States Patent No. 2,864,609, issued December 16, 1958. That invention employs a continuously-operating driving means, generally in the form of a capstan, with which the tape is yieldably engaged to be moved along a path through a reading station, and further employs a brake, which normally lightly engages the tape in a pre-loading manner, but which can be operated to grip the tape to arrest its motion promptly, the drive yielding at this time. A further important advance in overcoming these problems has been made in another previous invention of the present inventor, which is the subject of United States patent application Serial No. 14,888, filed March 14, 1960. In that invention, a novel magnetic drive means is employed, and electrical controls are utilized to actuate the brake and the drive means simultaneously, thereby improving control over tape movement and minimizing the likelihood of tape breakage.

The present invention furnishes an additional improvement in precise, effective control of tape movement, by providing more rapid, efficient action of the brake and the drive means than has heretofore been obtained, and by providing a new and more effective configuration for the driving means. Operation of the brake and the drive means is coordinated to optimize starting and stopping time and to minimize tape breakage.

The novel driving means includes two annular members, which are driven in opposite directions and which are so positioned that their peripheries are adapted to engage opposite sides of the tape being read. One of the annular members includes an element which is permanently magnetized in one polarity. An electromagnet is arranged in cooperative relation with the magnetized element, and its polarity can be switched so that it either attracts or repels the element. This is effective to bring the annular member containing the element into and out of engagement with the tape very positively and rapidly. In a similar manner, the armature of the brake is permanently magnetized in one polarity and is positioned in cooperative relationship with an electromagnet, which can be switched so that it either attracts or repels the armature. Here again, the armature can be brought into and out of engagement with the tape very positively and rapidly. The two electromagnets are controlled by the same operating circuitry, so that their movements are coordinated properly.

The path of the tape through the reading device extends between the brake armature and the stationary part of the brake, over the reading station, and between the two annular driving members. When it is desired to drive the tape past the reading station, the electromagnetic brake coils and the electromagnetic drive coils are energized in such a manner that the brake armature is repelled from the brake armature coils, thus releasing the braking force on the tape. At the same time, the permanently-magnetized annular driving member is attracted to the driving coils, so that the tape is gripped tightly between the two annular driving members and is caused to move due to the movement of said members. When it is desired to halt the movement of said members. When it is desired to halt the movement of the tape past the reading station, the electromagnetic brake coils and the electromagnetic drive coils are switched so that their polarity is opposite to the polarity in which they were energized during the driving of the tape. As a consequence, the magnetic armature of the brake is attracted to the brake coils to stop the tape very rapidly. At the same time, the magnetic element in one of the annular driving members is repelled by the reversed polarity of the drive coils, so that said one annular driving member is moved away from the electromagnetic drive coils, and consequently away from the other annular driving member. As a result, the tape is no longer gripped between the two annular driving members, and movement of the one annular driving member on which the tape rests is ineffective to cause movement of the tape, since the tape merely slides on the annular driving member as it rotates.

Accordingly, it is an object of the present invention to provide record media handling apparatus capable of accelerating tape from a halted condition at extremely high rates, and of halting the tape extremely rapidly.

Another object of the invention is to provide record media handling apparatus capable of operating at high speeds with minimum damage to the record media.

An additional object is to provide record media handling apparatus having braking means and driving means which function in cooperative relation to each other in response to the same signal.

A further object is to provide record media handling apparatus in which both the braking means and the driving means include permanently-magnetized elements which may be attracted or repelled by electromagnetic means in order to effect the desired movement and halting of the record media.

Still another object is to provide record media handling apparatus having a novel drive means comprising two constantly-rotating annular driving members capable of gripping the record media between them to impart movement to said record media.

Still a further object is to provide record media handling apparatus capable of imparting rapid acceleration and deceleration to record media and still remaining in proper adjustment after long periods of usage.

With these and incidental objects in view, the invention includes certain novel features of construction and combinations of parts, a preferred form or embodiment of which is hereinafter described with reference to the drawings which accomapny and form a part of this specification.

Figures 1, 2, 3:
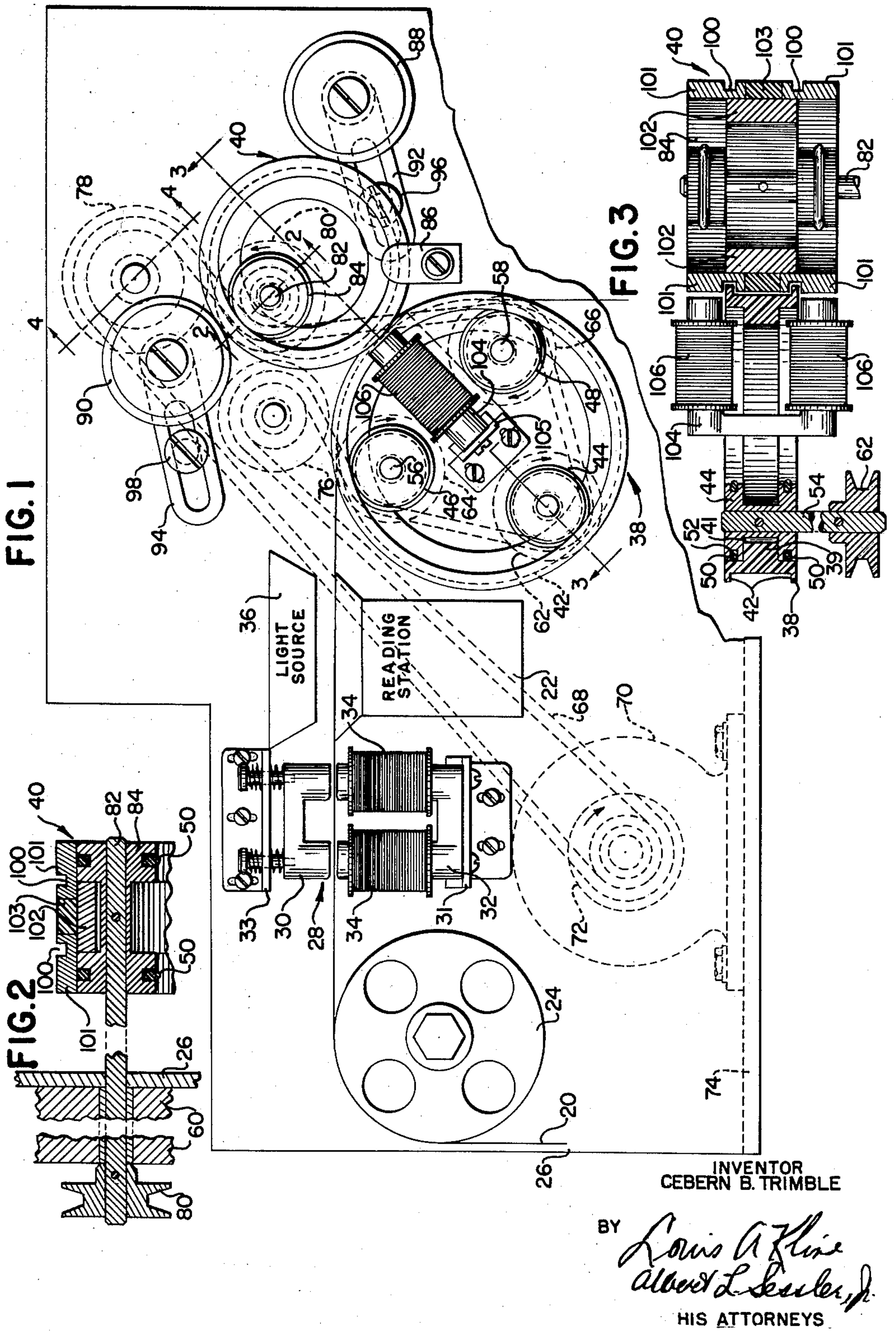
FIG. 1 is a side elevation of the tape handling apparatus, showing particularly the tape guiding means, the braking means, the reading station, and the driving means.
FIG. 2 is a sectional view taken on line 2—2 of FIG. 1, showing a cross section of the annular driving member containing the permanently-magnetized element, and showing the means for driving said annular member.
FIG. 3 is a sectional view taken on line 3—3 of FIG. 1, showing the two annular driving members in cooperative relation, and also showing the electromagnetic drive coils in position with respect to the driving members.

Referring now to the drawings, shown in FIG. 1 is a partially diagrammatic view of the various components making up the tape handling apparatus. The record tape 20 is positioned to be read at a reading station 22 as it is moved past that station. As the tape enters the apparatus at the left of FIG. 1, it passes over a guide 24, which serves to change the direction of movement of the tape, from vertical to horizontal. The guide 24 is mounted on a frame 26.

The means for supplying tape to the tape handling apparatus of the present invention is not shown, but may comprise, if desired, a tape supply reel and a loop box, as disclosed in the previously-mentioned United States Patent No. 2,864,609.

To the right of the guide 24, as viewed in FIG. 1, is a high-speed brake 28, through which the tape 20 passes, between an armature 30 and a lower portion 32, the lower portion 32 being secured to the frame 26 by an adjustable bracket 31. A pair of electromagnetic coils 34 are positioned on the two legs of the lower portion. The armature 30 is flexibly mounted above the lower portion 32 on an adjustable bracket 33, so that it may move downwardly for engagement with the tape to halt it, and may move upwardly to release the tape for further movement.

The armature 30 is permanently magnetized in a given polarity, and is fabricated of a material which possesses the desired characteristics of a high retentivity and high coercivity necessary in a permanent magnet. One example of such a material is "Alnico V," which is a commercially available alloy having a nominal composition of 8% aluminum, 14% nickel, 24% cobalt, 3% copper, and the balance iron. Other suitable materials include ferrites.

It will be seen that when the coils 34 are magnetized in the same polarity as the armature 30, said armature is repelled by the coils, and the tape is free to move through the brake 28. However, when the polarity of the coils 34 is reversed, in a manner which will be described subsequently, the coils then assume a polarity which is opposite to that of the armature 30, and the armature is strongly attracted to the coils located on the lower portion 32 of the brake 28. The tape is thus firmly gripped between the two portions of the brake 28 and is halted almost instantaneously.

To the right of the brake 28 is positioned the reading station 22. As the tape passes over the station 22, light from a source 36 passes through perforations in the tape and impinges upon correspondingly located photocells in the reading station to effect generation of signals which may then be amplified and applied to a computer or other utilizing device, as is well known in the art. For a complete description of a reading station and associated structure, reference may be had to the previously mentioned United States patent, No. 2, 864,609.

Figures 4, 5, 6, 7:
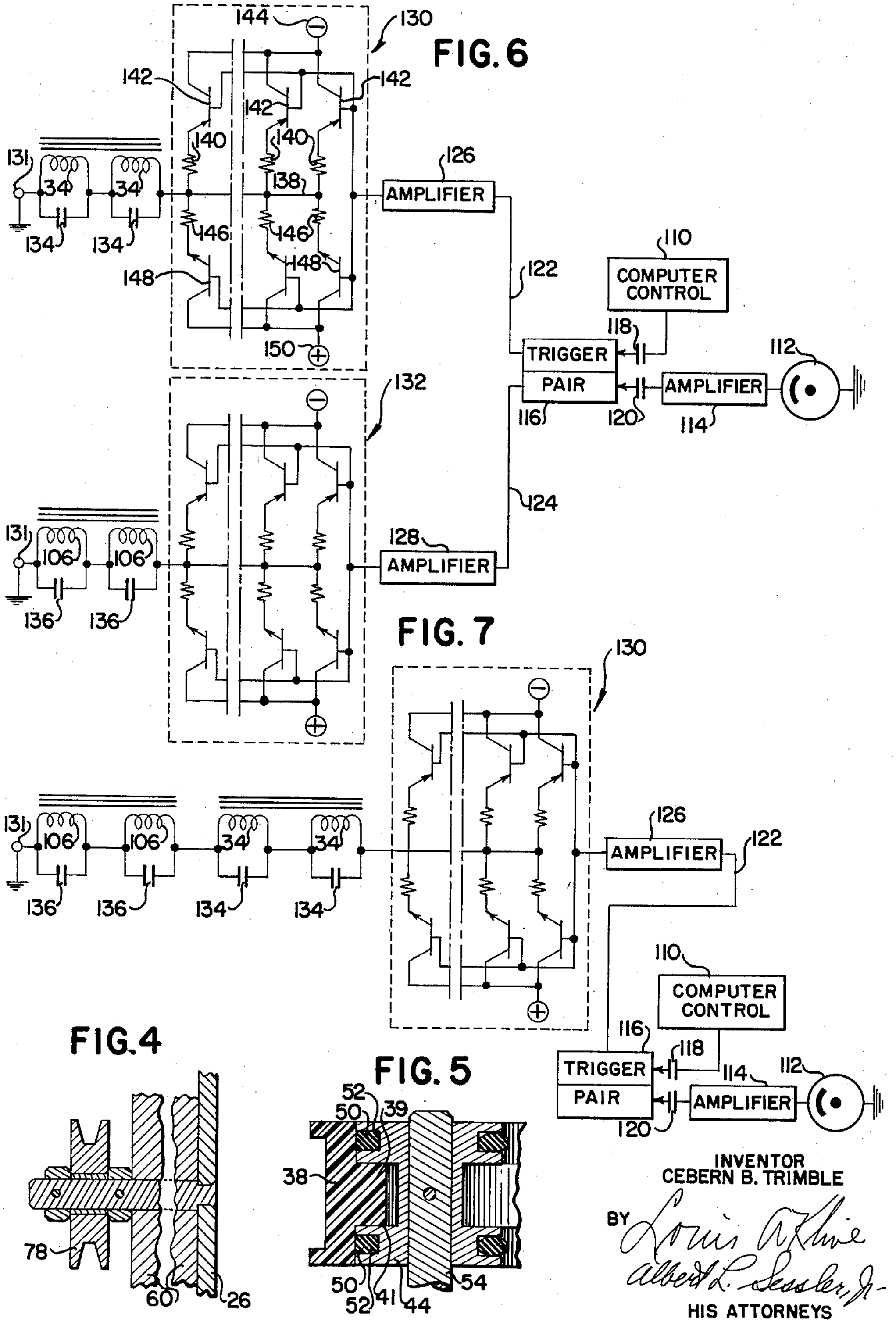
FIG. 4 is a sectional view taken along line 4—4 of FIG. 1, and showing one of the pulleys which forms a part of the driving means for driving the two annular driving members.
FIG. 5 is an enlarged fragmentary sectional view showing details of the manner in which one of the annular members is driven.
FIG. 6 is a circuit diagram showing a preferred embodiment of the control circuitry which may be employed in the tape handling apparatus of the present invention for controlling and coordinating the operation of the high-speed brake and driving means.
FIG. 7 is a circuit diagram showing a second embodiment of the control circuitry for the tape handling apparatus of the present invention.

Located to the right of the reading station 22, as viewed in FIG. 1, is the tape drive means, which includes two annular tape-driving members 38 and 40, between which the tape extends and by means of which it is driven. As shown in FIGS. 1, 3, and 5, the annular member 38 is formed of nylon or some other suitable material having a relatively high coefficient of friction, to facilitate engagement with the tape 20, and is provided with a pair of rims 42 to retain the tape 20 against transverse movement. The annular member 38 has formed thereon an internal aligning flange 39, and is driven clockwise by three driving wheels 44, 46, and 48, which are grooved at 41 to receive the flange 39, and which engage the inner surface of the annular members 38, by means of resilient tire-like members 50 (FIGS. 2, 3, and 5), formed of rubber or some similar material having a high coefficient of friction, which are positioned in grooves 52 in the periphery of the driving wheels. It will, of course, be obvious that other well-known driving means, such as cooperating gear teeth, for example, could be used to transmit power from the driving wheels to the annular member 38.

The wheels 44, 46, and 48 are secured to shafts 54, 56, and 58, extending through the frame 26 and a bearing block 60. Three pulleys 62, 64, and 66 are mounted on the other ends of the shafts 54, 56, and 58, and are driven through a belt 68 by a motor 70 having a pulley 72 fixed on its operating shaft. The motor 70 is supported on a base 74 secured to the frame 26. Two idler pulleys 76 and 78 are used to control the configuration and tension of the belt, which also engages a pulley 80 secured to a shaft 82, to the other end of which is fixed a driving wheel 84, which functions to drive the second annular member 40 counter-clockwise.

As shown in FIG. 1, the driving wheel 84 is so positioned that the annular member 40, which is supported by said driving wheel, is urged by the force of gravity toward a position of engagement of its outer cylindrical surface with the tape 20 at a location opposite that at which the outer cylindrical surface of the annular member 38 engages said tape. The action of the force of gravity on the member 40 is supplemented or opposed by a magnetic force acting on the member 40 to bring it into or out of engagement with the tape 20, as will be described subsequently.

Several guiding and retaining means are provided to maintain the annular member 40 in its proper relationship to the annular member 38. A bracket 86, fixed to the frame 26, retains the annular member 40 against movement along the longitudinal axis of the shaft 82. Also, guide rollers 88 and 90 prevent excessive vibration or swing of the member 40 as it is rotated by the driving wheel 84, and as it may be displaced by irregularities, such as splices in the tape. The guide rollers 88 and 90 are provided with peripheral bands of resilient material for contact with the annular member 40, and are rotatably mounted on slotted supports 92 and 94, respectively. These supports in turn are fixed to the frame 26 by means of bolts or other suitable fastening means 96 and 98, which may be loosened to permit the re-positioning of the supports 92 and 94 for adjustment of the relation of the rollers 88 and 90 to the annular member 40.

The bracket 86 and the guide rollers 88 and 90 are not essential to the proper operation of the tape-driving means, but do aid in maintaining the proper relationship of the annular member 40 with respect to the tape 20, and accordingly improve the operation of the driving means.

As is best shown in FIGS. 2 and 3, the annular member 40 includes an annular element 102, which is fabricated from a high-remanence, high-coercivity magnetic material, such as "Alnico V" or one of the ferrites, and which is permanently magnetized in a given polarity. The element 102 may suitably be made from the same material which is chosen for the armature 30 of the brake 28 and, in the illustrated embodiment of the invention, is magnetized in a polarity which is opposite to the polarity in which the armature 30 of the brake 28 is magnetized. It is, of course, obvious that by use of suitable electrical circuitry, the brake armature 30 and the element 102 in the annular member 40 may be magnetized in the same polarity and still give proper operation, if desired.

Positioned on each side of the annular element 102 are additional annular elements 101, which are formed of soft iron or other suitable material and act as pole pieces for the magnetic element 102. A further annular element 103 is located outwardly of the element 102 and between the elements 101. The element 103 is formed of nylon or some other suitable material having a relatively high coefficient of friction, to facilitate driving of the tape 20 by the members 38 and 40.

A pair of peripheral grooves 100 are provided on the elements 101 of the annular member 40 to receive the rims 42 of the annular members 38. This maintains proper registry of the annular members 38 and 40, and permits opposing surfaces of the two annular members to grip the corresponding surfaces of the tape 20 tightly to insure proper driving of said tape.

Symmetrically mounted with respect to the element 102, and fixed to the frame 26 by suitable means such as an adjustable bracket 105, is a U-shaped member 104, which is provided on each of its legs with an electromagnetic coil 106. When the current in the coils 106 causes the resulting flux in the member 104 to be in the same polarity as the element 102 of the annular member 40, said member 40 is repelled by the coils 106 and is swung counter-clockwise about its support on the driving wheel 84 against the resilient urging of the band on the guide roller 88. This action prevents the tape 20 from being gripped tightly between the constantly-rotating members 38 and 40 and thus prevents said tape from being driven by the movement of these members.

On the other hand, when the current in the coils 106 causes the resulting flux in the member 104 to be in a polarity which is opposite to that of the annular member 40, said member 40 is attracted to the coils 106 and is swung about its support on the driving wheel 84 to cause the tape 20 to be gripped tightly between cooperating surfaces of the annular members 38 and 40. Movement is thus imparted to the tape 20 by the two constantly-rotating annular driving members 38 and 40.

*Operating Circuitry*

Two forms of operating circuitry which may be used to control the magnetization of the pairs of coils 34 and 106 are shown in FIGS. 6 and 7.

The preferred embodiment is illustrated in FIG. 6. Although there is a certain amount of redundancy in this circuit, it provides stable, reliable means for performing the electrical functions required for proper operation of the tape-handling apparatus of the present invention. In this embodiment, initiation of movement of the tape is controlled by a signal, or "Resume Read Order," from a computer control element diagrammatically shown at 110 in FIG. 6. Stopping of the tape is under control of the signal sensed from the tape by means which are diagrammatically represented by the photocell 112 in FIG. 6. The signal derived from the photocell 112 is amplified by an amplifier diagrammatically shown at 114. It will, of course, be realized that start and stop signals for controlling movement of the tape 20 could be derived from other sources, if desired.

A trigger pair 116 receives input signals from the computer control element 110 and the amplifier 114 over coupling capacitors 118 and 120, respectively. The first output conductor 122 extends from one side of the trigger pair 116, and a second output conductor 124 extends from the other side. As is well known, the trigger pair 116 is a bistable element, which can be set to a first condition and will remain in said condition until a reset signal is received, to switch the trigger pair to a second condition. In the trigger pair diagrammatically shown here, the first condition produces a negative signal on the output conductor 122 and a positive signal on the output conductor 124, while the second condition produces a positive signal on the output conductor 122 and a negative signal on the output conductor 124.

The signals appearing on the conductors 122 and 124 are amplified by amplifiers 126 and 128 in series with said conductors and are then applied to switching networks generally shown at 130 and 132, respectively. Each of these switching networks is serially connected to a pair of coils, each coil being in parallel with a capacitor which functions to limit transient potentials developed by its associated coil during current switching, and also functions to permit faster switching of the current in its associated coil by transitional energy storage and release. The circuit containing each switching network and its associated coils extends to a terminal 131, to which is applied a base reference potential, shown here as ground. Brake-operating coils 34, with associated capacitors 134, are shown in series with the switching network 130, while drive coils 106, with associated capacitors 136, are shown in series with the switching network 132.

The function performed by each of the switching networks 130 and 132 is that of determining the direction of current flow through the associated pair of coils. As is well known, the direction of current flow through an electromagnetic coil determines the polarity of the electromagnetic field generated thereby. Accordingly, the polarity of the dynamic magnetic fields of the coils can be controlled by controlling the direction of current flow therethrough, and said coils can thus be caused to attract or repel the permanently-magnetized companion element; i.e., the brake armature 30 and the annular member 40, as desired.

Since both of the switching networks of FIG. 6 are the same, only the network 130 will be described. In the network 130, a number of switching stages are employed, the number varying according to the circuit parameters and the type of switching element employed. Each stage of the network comprises a first path, extending from a common 138 over a resistor 140 and a PNP-type transistor 142, having its collector connected in series with a terminal 144, to which a source of negative potential is applied. Also included in each stage is a second path, extending from the common 138 over a resistor 146 and an NPN-type transistor 148, having its emitter connected in series with the resistor 146 and having its collector connected in series with a terminal 150, to which a source of positive potential is applied.

The signal from the amplifier 126 is applied to the base of each of the transistors in each stage. The first and second circuit paths of the various stages are connected in parallel between the common 138 and the negative and positive terminals 144 and 150, so that there is a division of the energizing current for the electromagnetic coils connected to the switching network, a proportional part of the current being conducted over each stage. While three stages are shown as being used in the switching network 130, it will be clear that any desired number of stages may be used, the number being selected according to the requirements of the operating circuitry.

It will be seen that when a negative current signal is amplified by the amplifier 126 and applied to the base connections of the various transistors 142 and 148, the PNP-type transistors 142 conduct, the transistors 142 thus completing a path from the terminal 131 over the coils 34, the common 138, the resistors 140, and the transistors 142, to the terminal 144, the direction of current flow being from the ground terminal 131 to the negative terminal 144. In this case, the negative signal prevents conduction in the NPN-type transistors 148, and no path is completed over them.

On the other hand, when a positive signal is amplified by the amplifier 126 and applied to the base connections of the various transistors 142 and 148, the NPN-type transistors 148 conduct, thus completing a path from the positive terminal 150 over the transistors 148, the resistors 146, the common 138, and the coils 34 to the ground terminal 131, the direction of current flow being from the positive terminal 150 to the ground terminal 131. In this case, the positive signal prevents conduction in the NPN-type transistors 142, and no path is completed over them.

In a manner similar to that described above, the direction of current flow through the drive coils 106 is determined by the switching network 132 under control of the signal applied to said network from the amplifier 128. It will be seen that when a positive signal is applied to the switching network 130 from the amplifier 126, a negative signal is simultaneously applied to the switching network 132 from the amplifier 128. Accordingly, assuming that the sets of coils 34 and 106 are connected in the same sense, the polarity of the electromagnetic field generated by the coils 34 is opposite to that of the field generated by the coils 106. It is, of course, obvious that the connections of the windings of the coils 34 and 106 may be reversed if desired, as may be the orientation of the permanently-magnetized brake armature 30 and annular member 40, so that any desired relationship of polarity between the fields generated by the coils 34 and the fields generated by the coils 106 may be achieved.

If the windings of the coils 34 and 106 are connected in the same relationship in the circuit of FIG. 6, so that the polarity of the dynamic magnetic field generated by the coils 34 is opposite to the polarity of the dynamic magnetic field generated by the coils 106, then the permanent magnets forming the brake armature 30 and the annular driving member 40 should be the same with respect to each other, so that, when one of these elements is attracted by its respective dynamic magnetic field, the other of said elements will be repelled by its associated dynamic magnetic field. Of course, if desired, the polarity of the permanent magnetic field of the brake armature 30 can be opposite to that of the annular driving member 40, in which case the connections of the windings of the coils 34 and 106 should be altered with respect to each other, so that the dynamic magnetic fields produced by these coils are all of the same polarity. This also will produce the desired result of having one of the permanent magnetic elements being repelled while the other is attracted.

In the operating circuit of FIG. 7, components which are identical to those in the operating circuit of FIG. 6 have been given the same reference characters. Inspection will reveal that this circuit is very similar to that of FIG. 6, with the exception that only one output conductor 122 is provided from the trigger pair 116. The signal on this output conductor is amplified by means of the amplifier 126 and is applied to the switching network 130, which is effective, in the manner previously described, to control the direction of current flow through all of the coils 34 and 106, which in this case are serially connected between the switching network 130 and a terminal 131 connected to a base reference potential, shown here as ground. It will be seen that if all of the coils 34 and 106 are connected in the same manner with respect to each other, they will all have the same polarity at any given time. The permanent magnetic brake element 30 and annular element 40 must then be of opposite polarity with respect to each other for the apparatus to function properly. Conversely, if desired, the connections of the windings of either of the sets of coils 34 or 106 may be reversed, so that energization of the coils, with the current flowing in either direction, will produce a dynamic magnetic field in one set of coils which is opposite in polarity to the dynamic magnetic field in the other set of coils. In this case, the permanent magnetic elements 30 and 40 should be of the same polarity with respect to each other for proper functioning of the apparatus.

In summary, it is seen that the novel tape-handling apparatus of the present invention provides means for moving and halting tape with respect to a reading station, at which the tape is sensed and information is taken therefrom for use in a computer or other utilizing device. The tape-stopping means includes a two-element magnetic brake, comprising a lower element having magnetic coils positioned thereon and an upper element of a permanently-magnetized material. The tape-driving means comprises a pair of constantly-rotating annular elements, between which the tape passes. One of the annular elements is of a permanently-magnetized material, and adjacent it are positioned a pair of coils which may be energized to provide a dynamic electromagnetic field to work in conjunction with the magnetic field produced by the permanently-magnetized driving member. The current through the coils of the brake and the driving member is controlled by a control circuit which so regulates the current through these coils that when the permanently-magnetized member of the brake is attracted to its corresponding element, thus halting the tape, the permanently-magnetized driving element is repelled by its corresponding magnetic coils, so as to maintain itself slightly spaced from the other driving element, and to minimize driving of the tape. Conversely, when the brake coils are magnetized so as to repel the permanently-magnetized brake element, thus minimizing drag, the permanently-magnetized driving element is attracted by its corresponding coils into engagement with the tape, to grip the tape tightly between the two driving members and drive said tape.

The use of permanently-magnetized braking and driving elements makes possible more rapid acceleration and deceleration of the tape in this tape-handling apparatus than has heretofore been possible. The reason for this is that the magnetic fields associated with the permanently-magnetized elements are always in existence, and commence interaction with the dynamic magnetic fields created by the energization of the brake and drive coils more rapidly than would be possible if the brake and drive coils had, in effect, to function with elements which were magnetizable but not already magnetized, since the field build-up and resulting action would be slower in such case.

While the forms of the invention shown and described herein are admirably adapted to fulfill the objects primarily stated, it is to be understood that it is not intended to confine the invention to the forms or embodiments disclosed herein, for the invention is susceptible of embodiment in various other forms.

What is claimed is:

1. In a record media handling apparatus for controlling the movement of record media, the combination comprising magnetic braking means including an armature permanently magnetized in a given polarity and capable of stopping the record media when operated; electromagnetic brake control means associated with said armature and selectively magnetizable in either of two polarities to cause movement of the armature between a first position in which it is effective to halt movement of the record media and a second position in which it is ineffective to halt such movement; first continuously operating driving means normally engaging one side of the record media; second continuously operating driving means engageable with the other side of the record media and including an element permanently magnetized in a given polarity; electromagnetic drive control means adjacent the first continuously operating driving means and selectively magnetizable in either of two polarities to cause movement of the second driving means between a first position in which it coacts with the first driving means to drive the record media and a second position in which it is shifted out of coacting relation with the first driving means to reduce the driving force applied to the record media; first switching means for selectively reversing the direction of current flow through the electromagnetic brake control means to reverse the polarity of the magnetic field generated by said electromagnetic brake control means; second switching means for selectively reversing the direction of current flow through the electromagnetic drive control means to reverse the polarity of the magnetic field generated by said electromagnetic drive control means; a bistable element for controlling the operation of the first and second switching means; first signal input means for applying a "stop" signal to the bistable element; and second signal input means for applying a "resume read" signal to the bistable element.

2. In a record media handling apparatus for controlling the movement of record media, the combination comprising magnetic braking means including an armature permanently magnetized in a given polarity and capable of stopping the record media when operated; electromagnetic brake control means associated with said armature and selectively magnetizable in either of two polarities to cause movement of the armature between a first position in which it is effective to halt movement of the record media and a second position in which it is ineffective to halt such movement; first continuously operating driving means normally engaging one side of the record media; second continuously operating driving means engageable with the other side of the record media and including an element permanently magnetized in a given polarity; electromagnetic drive control means adjacent the first continuously operating driving means and selectively magnetizable in either of two palarities to cause movement of the second driving means between a first position in which it coacts with the first driving means to drive the record media and a second position in which it is shifted out of coacting relation with the first driving means to reduce the driving force applied to the record media; a switching element to which both the electromagnetic brake control means and the electromagnetic drive control means are serially connected, said switching element being selectively operable to reverse the direction of current flow through the electromagnetic brake control means and the electromagnetic drive control means to reverse the polarity of the magnetic fields generated by said electromagnetic brake control means and said electromagnetic drive control means; a bistable element for controlling the operation of the switching element; first signal input means for applying a "stop" signal to the bistable element; and second signal input means for applying a "resume read" signal to the bistable element.

3. In a record media handling apparatus for controlling the movement of record media, the combination comprising magnetic braking means including an armature permanently magnetized in a given polarity and capable of stopping the record media when operated; electromagnetic brake control means associated with said armature and selectively magnetizable in either of two polarities to cause movement of the armature between a first position in which it is effective to halt movement of the record media and a second position in which it is ineffective to halt such movement; first continuously operating driving means normally engaging one side of the record media; second continuously operating driving means engageable with the other side of the record media and including an element permanently magnetized in a given polarity; electromagnetic drive control means adjacent the first continuously operating driving means and selectively magnetizable in either of two polarities to cause movement of the second driving means between a first position in which it coacts with the first driving means to drive the record media and a second position in which it is shifted out of coacting relation with the first driving means to reduce the driving force applied to the record media; switching means for selectively reversing the direction of current flow through the electromagnetic brake control means and the electromagnetic drive control means to reverse the polarity of the magnetic fields generated by said electromagnetic brake control means and said electromagnetic drive control means; a bistable element for controlling the operation of the switching means; first signal input means for applying a "stop" signal to the bistable element; and second signal input means for applying a "resume read" signal to the bistable element.

4. In a record media handling apparatus for controlling the movement of record media, the combination comprising first continuously operating driving means normally engaging one side of the record media; second continuously operating driving means engageable with the other side of the record media and including an element permanently magnetized in a given polarity; electromagnetic control means adjacent the first continuously operating driving means and selectively magnetizable in either of two polarities to cause movement of the second driving means between a first position in which it coacts with the first driving means to drive the record media and a second position in which it is shifted out of coacting relation with the first driving means; switching means for selectively reversing the direction of current flow through the electromagnetic control means to reverse the polarity of the magnetic field generated by said electromagentic control means; a bistable element for controlling the operation of the switching means; first signal input means for applying a "stop" signal to the bistable element; and second signal input means for applying a "resume read" signal to the bistable element.

5. In a record media handling apparatus for controlling the movement of record media, the combination comprising magnetic braking means including a flexibly mounted armature permanently magnetized in a first polarity, said armature having a surface engageable with one side of said record media, said magnetic braking means also including a complementary element positioned adjacent said armature, and spaced therefrom sufficiently to permit the record media to pass between said armature and said element, said element having a surface engageable with the other side of said record media; electromagnetic brake control means associated with said armature and selectively magnetizable in either of two polarities to cause movement of the armature between a first position in which it is effective to coact with the complementary element to halt the record media and a second position in which it is shifted out of coacting relation with the complementary element; switching means for selectively reversing the direction of current flow through the electromagnetic brake control means to reverse the polarity of the magnetic field generated by said electromagnetic brake control means; a bistable element for controlling the operation of the switching means; first signal input means for applying a "stop" signal to the bistable element; and second signal input means for applying a "resume read" signal to the bistable element.

6. In a record media handling apparatus for controlling the movement of record media, the combination comprising magnetic braking means including a permanently magnetized armature capable of stopping the record media when operated; brake control means associated with said armature and selectively magnetizable to repel or attract the armature; first continuously operating driving means normally engaging one side of the record media; second continuously operating driving means engageable with the other side of the record media and including a permanently magnetized element; drive control means associated with the second continuously operating driving means and selectively magnetizable to attract or repel said second continuously operating driving means to bring said second continuously operating driving means into and out of engagement with the record media; and operating means for simultaneously reversing the polarity of the brake control means and the drive control means to effect starting and stopping of movement of the record media.

7. In a record media handling apparatus for controlling the movement of record media, the combination comprising a first annular member arranged to engage one side of the record media; first constantly operating driving means supporting the first annular member in position and causing it to rotate continuously; a second annular member arranged to engage a second side of the record media, said second annular member including a permanently magnetized element; second constantly operating driving means supporting the second annular member in position and causing it to rotate continuously; an electromagnetic element positioned within the inner periphery of the first annular member and having its pole piece adjacent the permanently magnetized element of the second annular member, said electromagnetic element being selectively magnetizable in either of two polarities to attract or repel the permanently magnetized element in the second annular member to cause said second annular member to move into or out of engagement with the record media, the record media being gripped between the two continuously rotating annular members and driven thereby when the second annular member is moved into engagement with the record media; and control means for determining the polarity of the electromagnetic means in response to control signals.

8. In a record media handling apparatus for controlling the movement of record media, the combination comprising a first annular member arranged to engage one side of the record media; first constantly operating driving means supporting the first annular member in position and causing it to rotate continuously; a second annular member arranged to engage a second side of the record media, said second annular member including a permanently magnetized element; second constantly operating driving means supporting the second annular member in position and causing it to rotate continuously; electromagnetic means selectively magnetizable in either of two polarities to attract or repel the permanently magnetized element in the second annular member to cause said second annular member to move into or out of engagement with the record media, the record media being gripped between the two continuously rotating annular members and driven thereby when the second annular member is moved into engagement with the record media; and control means for determining the polarity of the electromagnetic means in response to control signals.

9. In a record media handling apparatus for controlling the movement of record media, the combination comprising first continuously operating driving means normally engaging one side of the record media; second continuously operating driving means engageable with the other side of the record media and including an element permanently magnetized in a given polarity; and control means adjacent the first continuously operating driving means and selectively magnetizable in either of two polarities to attract or repel said second driving means, whereby said control means is effective to terminate driving of the record media when said control means is magnetized in one polarity, and whereby said control means is effective to initiate driving of the record media when said control means is magnetized in a second polarity.

10. In a record media handling apparatus for controlling the movement of record media, the combination comprising magnetic breaking means including a flexibly mounted armature permanently magnetized in a first polarity, said armature having a surface engageable with one side of said record media, said magnetic braking means also including a complementary element positioned adjacent said armature, and spaced therefrom sufficiently to permit the record media to pass between said armature and said element, said element having a surface engageable with the other side of said record media; brake control means associated with said armature and selectively magnetizable in a first or second polarity to repel or attract the armature; and operating means for selectively reversing the polarity of the brake control means to shift the armature of the magnetic braking means between a first position in which it is effective to halt movement of the record media and a second position in which it is ineffective to halt such movement.

11. In a record media handling apparatus for controlling the movement of record media, the combination comprising a first annular member arranged to engage one side of the record media, and having an internal aligning flange thereon; first constantly operating driving means including three constantly rotating circular elements disposed in a triangular configuration within the inner periphery of said first annular member, each circular element being grooved to receive the internal flange on the first annular member, and each circular element being provided with at least one peripheral resilient friction element to facilitate driving of said first annular member by said circular elements; a second annular member arranged to engage a second side of the record media; second continuously operating driving means for causing continuous rotation of said second annular member; and control means to cause said second annular member to move selectively into or out of engagement with the record media, the record media being gripped between the two continuously rotating annular members and driven thereby when the second annular member is moved into engagement with the record media.

12. In a record media handling apparatus for controlling the movement of record media, the combination comprising a first annular member arranged to engage one side of the record media; first constantly operating driving means including three constantly rotating circular elements disposed in a triangular configuration within the inner periphery of said first annular member, each circular element being provided with at least one peripheral resilient friction element to facilitate driving of said first annular member by said circular elements; a second annular member arranged to engage a second side of the record media; second continuously operating driving means for causing continuous rotation of said second annular member; and control means to cause said second annular member to move selectively into or out of engagement with the record media, the record media being gripped between the two continuously rotating annular members and driven thereby when the second annular member is moved into engagement with the record media.

13. In a record media handling apparatus for controlling the movement of record media, the combination comprising a first rigid annular member of circular configuration arranged to engage one side of the record media; first constantly operating driving means including a plurality of constantly rotating circular elements disposed within the inner periphery of said first annular member; a second rigid annular member of circular configuration arranged to engage a second side of the record media; second continuously operating driving means for causing continuous rotation of said second annular member; and control means to cause said second annular member to move selectively into or out of engagement with the record media, the record media being gripped between the two continuously rotating annular members and driven thereby when the second annular member is moved into engagement with the record media.

14. In a record media handling apparatus for controlling the movement of record media, the combination comprising a first annular member arranged to engage one side of the record media, and provided with a pair of peripheral flanges to maintain the record media therebetween in proper position with respect to the first annular member; first constantly operating driving means supporting the first annular member in position and causing it to rotate continuously; a second annular member arranged to engage a second side of the record media, said second annular member being provided with a pair of peripheral grooves to receive the peripheral flanges on the first annular member; second continuously operating driving means supporting the second annular member in position and causing it to rotate continuously; and control means to cause said second annular member to move selectively into or out of engagement with the record media, the record media being gripped between the two continuously rotating annular members and driven thereby when the second annular member is moved into engagement with the record media.

15. In a record media handling apparatus for controlling the movement of record media, the combination comprising a first annular member arranged to engage one side of the record media, and provided with at least one peripheral flange to maintain the record media in proper position with respect to the first annular member; first constantly operating driving means supporting the first annular member in position and causing it to rotate continuously; a second annular member arranged to engage a second side of the record media, said second annular member being provided with a peripheral groove to receive the peripheral flange on the first record member; second continuously operating driving means supporting the second annular member in position and causing it to rotate continuously; and control means to cause one of said annular members to move selectively into or out of engagement with the record media, the record media being gripped between the two continuously rotating annular members and driven thereby when said one of said annular member is moved into engagement with the record media.

References Cited in the file of this patent

UNITED STATES PATENTS

| | | |
|---|---|---|
| 2,794,157 | Chisholm | May 28, 1957 |
| 2,908,829 | Schaeve | Oct. 13, 1959 |
| 3,002,671 | Brumbaugh et al. | Oct. 3, 1961 |